United States Patent
Nishijima et al.

(10) Patent No.: US 11,936,244 B2
(45) Date of Patent: Mar. 19, 2024

(54) ROTOR, MOTOR, AND COMPRESSOR

(71) Applicant: DAIKIN INDUSTRIES, LTD., Osaka (JP)

(72) Inventors: Kiyotaka Nishijima, Osaka (JP); Akinobu Ishizaki, Osaka (JP); Hisato Sumitomo, Osaka (JP); Takanori Hori, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 459 days.

(21) Appl. No.: 17/277,280

(22) PCT Filed: Aug. 20, 2019

(86) PCT No.: PCT/JP2019/032420
§ 371 (c)(1),
(2) Date: Mar. 17, 2021

(87) PCT Pub. No.: WO2020/066368
PCT Pub. Date: Apr. 2, 2020

(65) Prior Publication Data
US 2021/0296951 A1    Sep. 23, 2021

(30) Foreign Application Priority Data
Sep. 28, 2018  (JP) ................. 2018-184111

(51) Int. Cl.
*H02K 1/276* (2022.01)
*F25B 1/00* (2006.01)
(Continued)

(52) U.S. Cl.
CPC .......... *H02K 1/2766* (2013.01); *F25B 1/005* (2013.01); *H02K 21/16* (2013.01); *H02K 29/03* (2013.01)

(58) Field of Classification Search
CPC ...... H02K 1/2766; H02K 21/16; H02K 29/03; F25B 1/005
See application file for complete search history.

(56) References Cited

U.S. PATENT DOCUMENTS

2002/0067096 A1    6/2002 Yamamoto et al.
2010/0166575 A1*   7/2010 Fukuda ................. H02K 1/276
                                         310/216.106
(Continued)

FOREIGN PATENT DOCUMENTS

CN    1715676 A      1/2006
CN    206353733 U    7/2017
(Continued)

OTHER PUBLICATIONS

European Search Report of corresponding EP Application No. 19 86 5327.1 dated Aug. 19, 2021.
(Continued)

*Primary Examiner* — Jue Zhang
(74) *Attorney, Agent, or Firm* — Global IP Counselors, LLP

(57) ABSTRACT

A rotor includes a rotor core. The rotor core has an outer shape including a first arc portion provided so as to intersect a d-axis, a straight line portion provided so as to intersect a q-axis, and a curved portion that connects the first arc portion and the straight line portion. The first arc portion has an arc shape centered on an axial center of the rotor core. The curved portion includes an arc-shaped second arc portion that bulges outward in a radial direction of the rotor core. The radius of curvature of the second arc portion being smaller than a radius of curvature of the first arc portion.

8 Claims, 10 Drawing Sheets

(51) Int. Cl.
    *H02K 21/16*     (2006.01)
    *H02K 29/03*     (2006.01)

(56) References Cited

U.S. PATENT DOCUMENTS

| | | |
|---|---|---|
| 2011/0050022 A1 | 3/2011 | Li et al. |
| 2014/0232230 A1 | 8/2014 | Yabe et al. |

FOREIGN PATENT DOCUMENTS

| | | |
|---|---|---|
| CN | 207368762 U | 5/2018 |
| EP | 2 012 410 A1 | 1/2009 |
| JP | 2002-10541 A | 1/2002 |
| JP | 2014-54155 A | 3/2014 |
| WO | 2008/139675 A1 | 11/2008 |
| WO | 2013/011546 A1 | 1/2013 |

OTHER PUBLICATIONS

International Search Report of corresponding PCT Application No. PCT/JP2019/032420 dated Oct. 15, 2019.
International Preliminary Report of corresponding PCT Application No. PCT/JP2019/032420 dated Apr. 8, 2021.

\* cited by examiner

ROTOR, MOTOR, AND COMPRESSOR

CROSS-REFERENCE TO RELATED APPLICATIONS

This U.S. National stage application claims priority under 35 U.S.C. § 119(a) to Japanese Patent Application No. 2018-184111, filed in Japan on Sep. 28, 2018, the entire contents of which are hereby incorporated herein by reference.

BACKGROUND

Field of the Invention

The present disclosure relates to a rotor, a motor, and a compressor.

Background Information

As a conventional rotor, in order to increase output torque and decrease inductance, an outer shape of one pole of the rotor is composed of a curve of a hyperbolic cosine function (see JP 2002-10541 A).
Patent Literature 1: JP 2002-10541 A

SUMMARY

In the above-mentioned conventional rotor, an air gap between the rotor and a stator increases exponentially as a distance from the center of the outer shape of one pole of the rotor increases in a circumferential direction of the rotor. Accordingly, electromagnetic force generated between the rotor and the stator changes abruptly at an end of the outer shape of one pole of the rotor, and higher-order electromagnetic force is generated. As a result, vibration caused by the higher-order electromagnetic force may occur. However, the vibration caused by the electromagnetic force generated between the rotor and the stator is not considered in JP 2002-10541 A.

The present disclosure proposes a rotor capable of suppressing vibration during rotation, a motor using the rotor, and a compressor using the motor.

A rotor of the present disclosure includes: a rotor core having an outer shape including a first arc portion provided so as to intersect a d-axis, a straight line portion provided so as to intersect a q-axis, and a curved portion that connects the first arc portion and the straight line portion, in which the first arc portion has an arc shape centered on a center of the rotor core, the curved portion includes an arc-shaped second arc portion that bulges outward in a radial direction of the rotor core, and a radius of curvature of the second arc portion is smaller than a radius of curvature of the first arc portion.

According to the present disclosure, since the radius of curvature of the second arc portion is smaller than the radius of curvature of the first arc portion, the first arc portion and the straight line portion can be smoothly connected by the curved portion including the second arc portion. Therefore, a sudden change in an air gap between the rotor and a stator is suppressed when the rotor rotates. As a result, a sudden change in electromagnetic force generated between the rotor and the stator is suppressed. Accordingly, vibration caused by the electromagnetic force can be effectively suppressed.

In the rotor of one aspect, an angular range in a circumferential direction of the straight line portion is larger than an angular range in a circumferential direction of the first arc portion, when viewed from the axial center of the rotor core.

In the rotor of one aspect, an angular range in a circumferential direction of the curved portion is larger than the angular range in the circumferential direction of the straight line portion, when viewed from the axial center of the rotor core.

In the rotor of one aspect, the first arc portion and the second arc portion are directly connected, and inclination of a tangent line of the second arc portion at an end point of the second arc portion at which the second arc portion is connected to the first arc portion substantially coincides with inclination of a tangent line of the first arc portion at an end point of the first arc portion at which the first arc portion is connected to the second arc portion.

According to the above aspect, since the first arc portion and the second arc portion are connected substantially smoothly, resistance to fluid (stirring loss) flowing around the rotor during rotation of the rotor can be reduced while effectively suppressing vibration.

In the rotor of one aspect, the first arc portion and the second arc portion are directly connected, and a tangent line of the second arc portion at an end point of the second arc portion at which the second arc portion is connected to the first arc portion coincides with a tangent line of the first arc portion at an end point of the first arc portion at which the first arc portion is connected to the second arc portion.

According to the above aspect, since the first arc portion and the second arc portion are smoothly connected, resistance to fluid (stirring loss) flowing around the rotor during rotation of the rotor can be reduced while effectively suppressing vibration.

In the rotor of one aspect, the second arc portion and the straight line portion are directly connected, and a tangent line of the second arc portion at an end point of the second arc portion at which the second arc portion is connected to the straight line portion extends in an extending direction of the straight line portion.

According to the above aspect, since the second arc portion and the straight line portion are smoothly connected, resistance to fluid (stirring loss) flowing around the rotor during rotation of the rotor can be reduced while effectively suppressing vibration.

A motor of one aspect of the present disclosure includes: the rotor of one of the above-described aspects; and a stator disposed so as to surround an outer peripheral surface of the rotor.

A compressor of one aspect of the present disclosure includes: a hermetic container; a compression mechanism unit disposed in the hermetic container; and the motor of the above-described aspect, the motor being disposed in the hermetic container and configured to drive the compression mechanism unit via a rotating shaft.

DETAILED DESCRIPTION OF EMBODIMENT(S)

Hereinafter, a rotor, a motor, and a compressor according to embodiments of the present disclosure will be described with reference to the accompanying drawings.

First Embodiment

Figure 1:
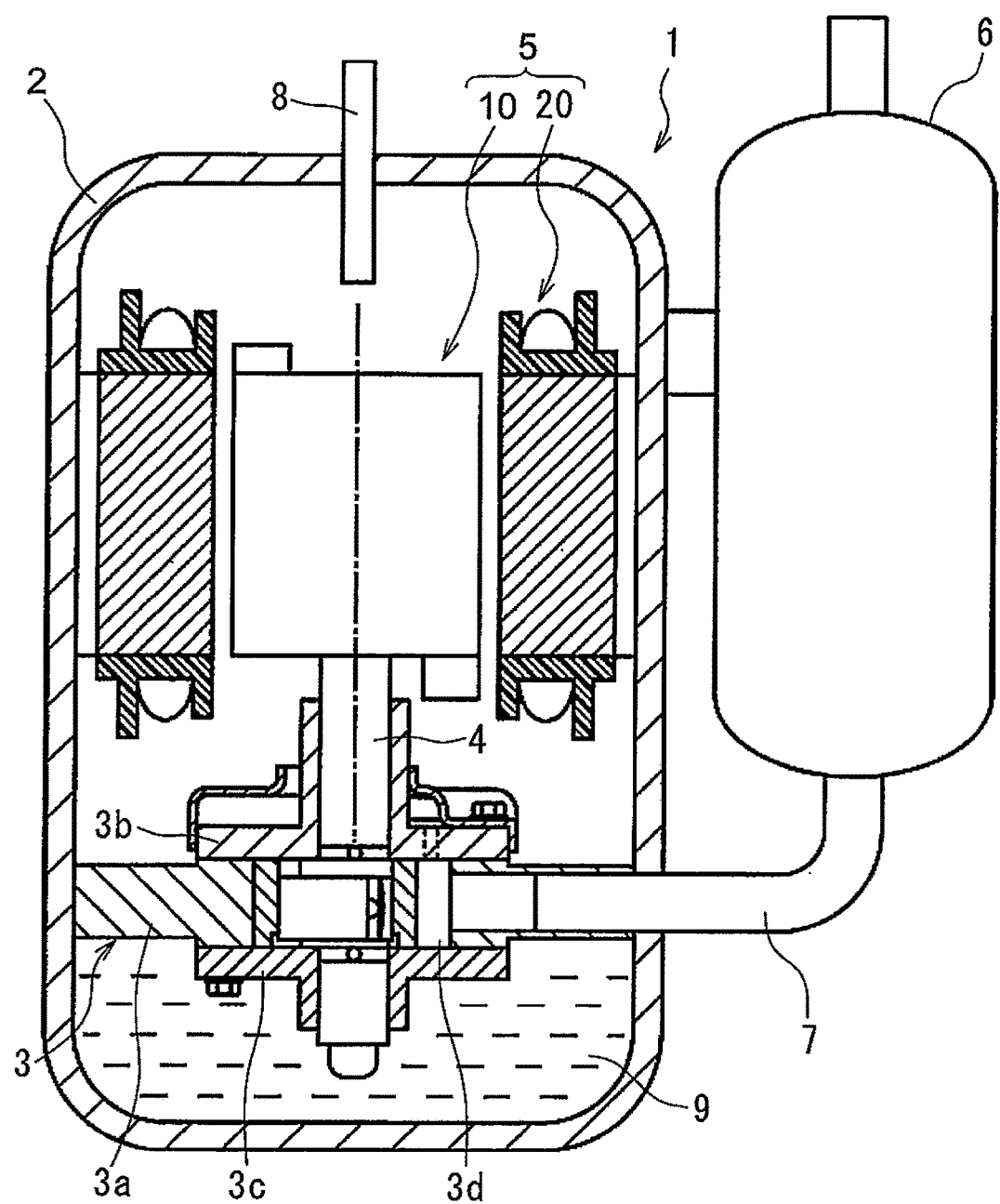
FIG. 1 is a schematic longitudinal sectional view of a compressor according to a first embodiment of the present disclosure.

FIG. 1 is a schematic sectional view of a compressor of the present embodiment when taken along a vertical plane.

The compressor 1 includes a hermetic container 2, a compression mechanism unit 3 disposed in the hermetic container 2, and a motor 5 disposed in the hermetic container 2 and configured to drive the compression mechanism unit 3 via a shaft 4. This compressor 1 can be used, for example, in an air conditioner.

The compressor 1 is a so-called vertical high-pressure dome-type rotary compressor, and has the compression mechanism unit 3 disposed on a lower side of the hermetic container 2 and the motor 5 disposed above the compression mechanism unit 3. The compression mechanism unit 3 is driven by a rotor 10 of the motor 5 via the shaft 4. The shaft 4 is an example of a rotating shaft according to the present disclosure.

When the compressor 1 is used for an air conditioner, the compression mechanism unit 3 sucks refrigerant gas from an accumulator 6 through a suction pipe 7. Controlling a condenser, an expansion mechanism, and an evaporator (not shown) that constitute an air conditioner that is an example of a refrigeration system together with the compressor 1 sends the refrigerant gas to the compressor 1.

Further, the compressor 1 discharges the compressed high-temperature and high-pressure refrigerant gas from the compression mechanism unit 3 to fill the inside of the hermetic container 2. This refrigerant gas passes through a gap between the rotor 10 and a stator 20 of the motor 5, and is discharged outside from a discharge pipe 8 provided above the motor 5. Further, formed below a high-pressure area in the hermetic container 2 is an oil sump 9 in which lubricating oil is stored.

The compression mechanism unit 3 includes a cylinder 3a mounted to an inner surface of the hermetic container 2, an upper-end plate member 3b and a lower-end plate member 3c mounted to upper and lower opening edges of the cylinder 3a, respectively. The cylinder 3a, the upper-end plate member 3b, and the lower-end plate member 3c define a cylinder chamber 3d.

Figure 2:
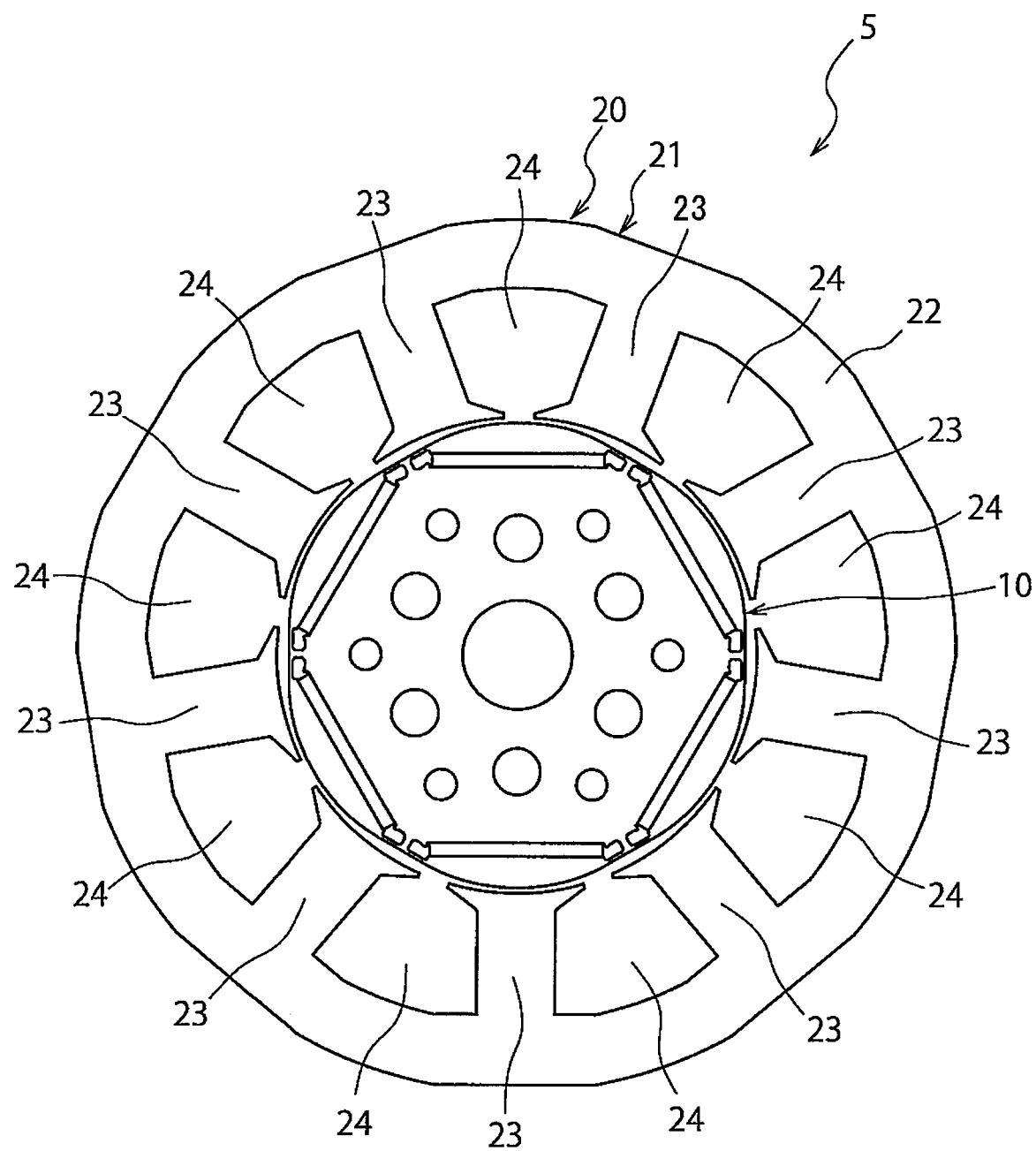
FIG. 2 is a view of a motor according to the first embodiment of the present disclosure as viewed from an axial direction of the motor.

FIG. 2 is a view of the motor according to the present embodiment as viewed from an axial direction of the motor.

Referring to FIG. 2, the motor 5 in the present embodiment is a so-called six-pole nine-slot inner rotor type. The motor 5 includes the rotor 10 and the stator 20 disposed so as to surround an outer peripheral surface of the rotor 10. A non-uniform air gap (so-called unequal gap) in a circumferential direction of the rotor 10 is provided between the stator 20 and the rotor 10. Further, the rotor 10 and the stator 20 are disposed so that the center of the rotor 10 and the center of the stator 20 coincide with each other.

The stator 20 includes a stator core 21 and a stator coil (not shown) wound around teeth portions 23 of the stator core 21, which will be described later. When current is applied to the stator coil, electromagnetic force generated in the stator 20 rotates the rotor 10 together with the shaft 4 (shown in FIG. 1).

The stator core 21 in the present embodiment has an annular yoke portion 22 and nine teeth portions 23 protruding inward in a radial direction of the stator core 21 from an inner peripheral surface of the yoke portion 22.

The teeth portions 23 are disposed at equal intervals along a circumferential direction of the stator core 21. Specifically, the teeth portions 23 are disposed at intervals of 40 degrees along the circumferential direction of the stator core 21 with an axial center of the stator core 21 as the center. In other words, the nine teeth portions 23 are disposed at positions symmetrical with respect to the axial center of the stator core 21 nine times. Further, the teeth portions 23 extend from the inner peripheral surface of the yoke portion 22 toward the axial center of the stator core 21.

Further, a slot 24 is formed between two teeth portions 23 adjacent to each other in the circumferential direction of the stator core 21. In other words, the stator core 21 includes nine slots 24 evenly spaced along the circumferential direction of the stator core 21. Specifically, the slots 24 are disposed at intervals of 40 degrees in the circumferential direction of the stator core 21 with the axial center as the center. In other words, the nine slots 24 are disposed at positions symmetrical with respect to the axial center of the stator core 21 nine times.

Figure 3:
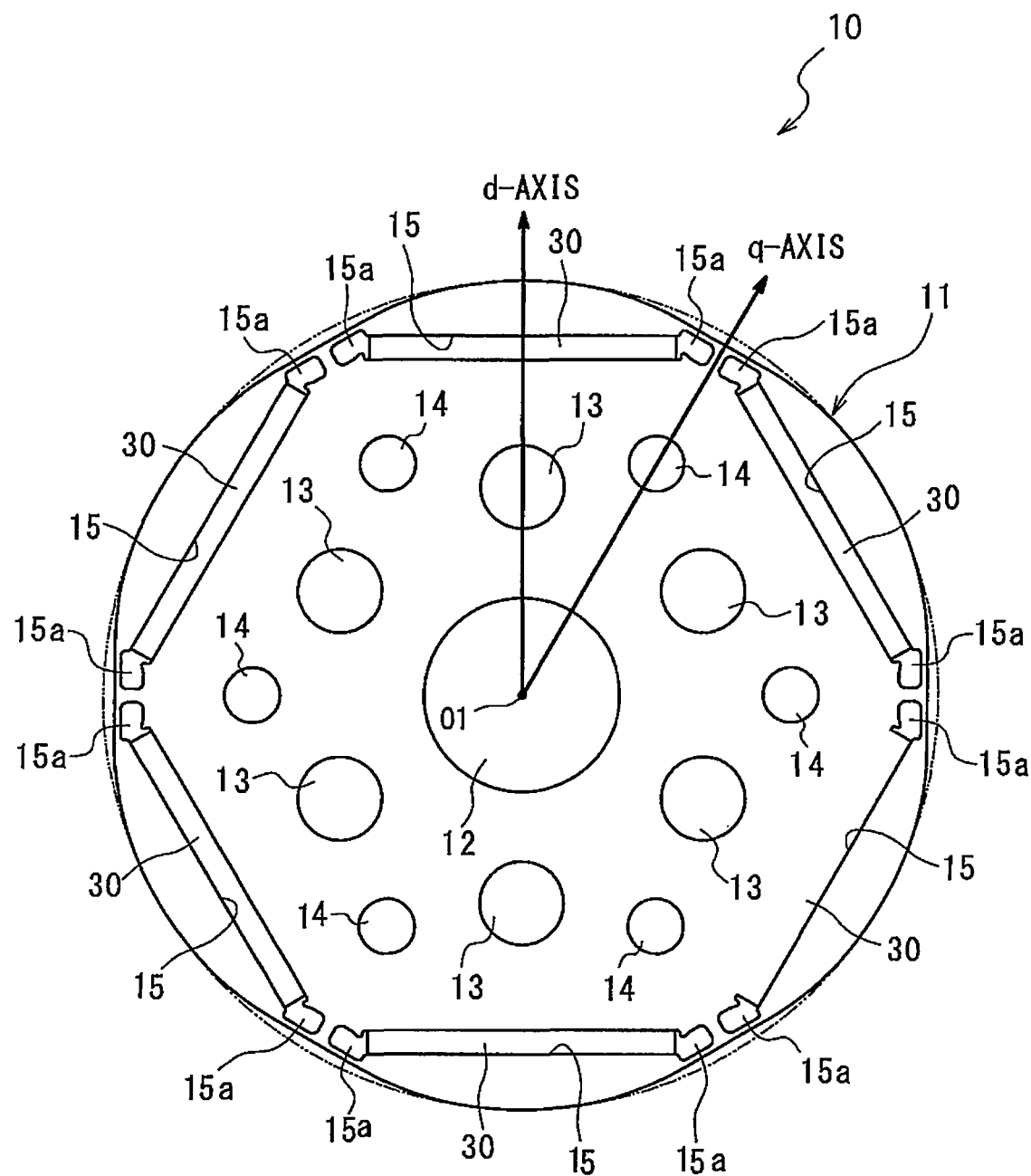
FIG. 3 is a view of a rotor according to the first embodiment as viewed from an axial direction of the rotor.

FIG. 3 is a diagram of the rotor 10 according to the present embodiment as viewed from an axial direction of the rotor 10.

The rotor 10 includes a columnar rotor core 11 and six permanent magnets 30 inserted into six magnet insertion holes 15 (described later) of the rotor core 11.

The rotor core 11 of the present embodiment includes a shaft hole 12, six ventilation holes 13, six rivet holes 14, and the six magnet insertion holes 15. The shaft hole 12, the ventilation hole 13, the rivet hole 14, and the magnet insertion hole 15 penetrate the rotor core 11 in an axial direction of the rotor core 11.

The shaft hole 12 is provided in a central portion of the rotor core 11. Further, the shaft hole 12 is configured so that the shaft 4 (shown in FIG. 1) of the motor 5 can be inserted.

The ventilation holes 13 are disposed at equal intervals along a circumferential direction of the rotor core 11. Specifically, the ventilation holes 13 are provided at intervals of 60 degrees along the circumferential direction of the rotor core 11 with an axial center O1 of the rotor core 11 as the center. In other words, the six ventilation holes 13 are disposed at positions symmetrical with respect to the axial center O1 of the rotor core 11 six times.

The rivet holes 14 are disposed at equal intervals along the circumferential direction of the rotor core 11. Specifically, the rivet holes 14 are provided at intervals of 60 degrees along the circumferential direction of the rotor core 11 with the axial center O1 of the rotor core 11 as the center. In other words, the six rivet holes 14 are disposed at positions symmetrical with respect to the axial center O1 of the rotor core 11 six times. The rivet hole 14 is configured so that a rivet (not shown) can be inserted.

The magnet insertion hole 15 has a substantially rectangular shape extending so as to be orthogonal to a radial direction of the rotor core 11 when viewed from the axial direction of the rotor core 11, and is configured so that the permanent magnet 30 can be inserted. The magnet insertion holes 15 are provided outside in the radial direction of the rotor core 11 with respect to the ventilation holes 13, and are disposed at equal intervals along the circumferential direction of the rotor core 11. Specifically, the magnet insertion holes 15 are disposed at intervals of 60 degrees along the circumferential direction of the rotor core 11 with the axial center O1 of the rotor core 11 as the center. In other words, the six magnet insertion holes 15 are disposed at positions symmetrical with respect to the axial center O1 of the rotor core 11 six times. The magnet insertion holes 15 are provided so as to draw a hexagon when viewed from the axial direction of the rotor core 11.

Further, the magnet insertion hole 15 includes magnetic flux short circuit prevention portions 15a for preventing short-circuiting of magnetic flux of the permanent magnet 30 at both ends in an extending direction. The magnetic flux short circuit prevention portion 15a is a space in the magnet insertion hole 15 in which the permanent magnet 30 is not disposed.

The permanent magnet 30 has a rectangular shape when viewed from the axial direction of the rotor core 11, and is inserted into the magnet insertion hole 15. The permanent magnets 30 are disposed at equal intervals along the circumferential direction of the rotor core 11. Specifically, the permanent magnets 30 are disposed at intervals of 60 degrees along the circumferential direction of the rotor core 11 with the axial center O1 of the rotor core 11 as the center. In other words, the six permanent magnets 30 are disposed at positions symmetrical with respect to the axial center O1 of the rotor core 11 six times. Since the permanent magnets 30 are inserted into the magnet insertion holes 15, they are provided so as to draw a hexagon when viewed from the axial direction of the rotor core 11.

Further, the rotor core 11 has a d-axis corresponding to a line connecting a midpoint in a longitudinal direction of the permanent magnet 30 and the axial center O1 of the rotor core 11. The d-axis is a line bisecting the permanent magnet 30 when viewed from the axial direction of the rotor core 11. Further, a direction in which the d-axis extends is a direction in which magnetic flux does not easily flow. The d-axis extends in a direction forming a mechanical angle of 30 deg with respect to a q-axis described later.

Further, the rotor core 11 has a q-axis corresponding to a line that connects a midpoint between facing ends of two magnet insertion holes 15 adjacent to each other in the circumferential direction of the rotor core 11 and the axial center O1 of the rotor core 11. A direction in which the q-axis extends is a direction in which magnetic flux easily flows. As mentioned above, the q-axis extends in a direction forming the mechanical angle of 30 deg with respect to the d-axis.

(Outer Shape of Rotor Core)

Figure 4:
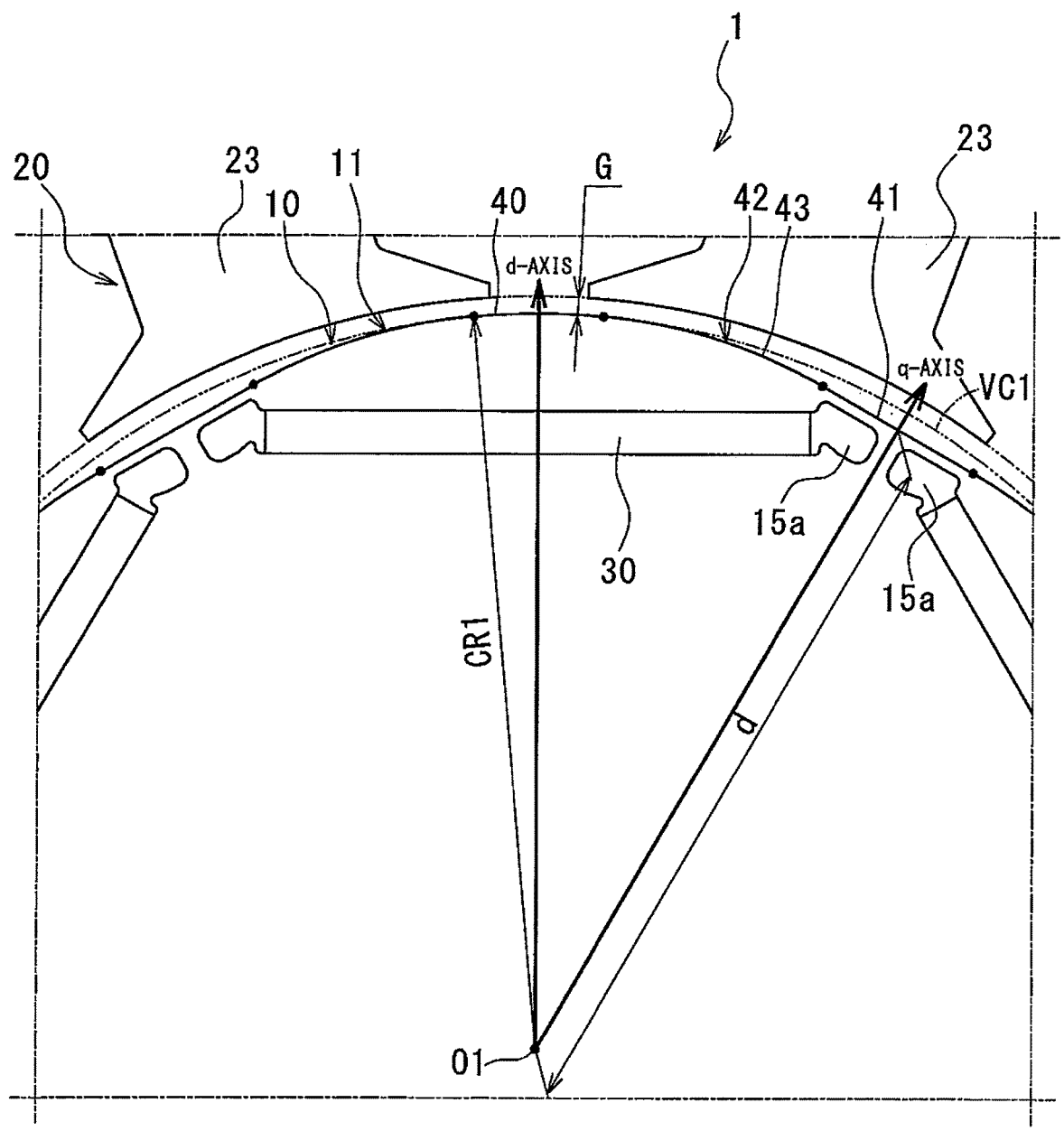
FIG. 4 is an enlarged view of a main part of the motor in FIG. 2.

Hereinafter, an outer shape of one pole of the rotor core 11 according to the present embodiment will be described. FIG. 4 is an enlarged view of a main part of the motor 5 according to the present embodiment. In FIG. 4, the shaft hole 12, the ventilation hole 13, and the rivet hole 14 are omitted.

Referring to FIG. 4, the rotor core 11 of the present embodiment includes a first arc portion 40 provided so as to intersect the d-axis, a straight line portion 41 provided so as to be orthogonal to the q-axis, and a curved portion 42 for connecting the first arc portion 40 and the straight line portion 41. The straight line portion 41 and the curved portion 42 are disposed radially inside a virtual circle VC1 including the first arc portion 40 as a part.

The first arc portion 40 has an arc shape with a radius of curvature CR1 centered on the axial center O1 of the rotor core 11. Further, the first arc portion 40 intersects the d-axis at the center in a circumferential direction of the first arc portion 40. The first arc portion 40 is disposed outside in the radial direction of the rotor core 11 with respect to the permanent magnet 30.

An air gap G between the rotor 10 and the stator 20 is constant and minimum in the first arc portion 40.

The straight line portion 41 is linear and extends so as to be orthogonal to the q-axis at the center in an extending direction of the straight line portion 41. Further, the straight line portion 41 is disposed outside in the radial direction of the rotor core 11 with respect to the magnetic flux short circuit prevention portion 15a of the magnet insertion hole 15. When viewed from the axial direction of the rotor core 11, the extending direction of the straight line portion 41 is orthogonal to the radial direction of the rotor core 11.

Further, as described above, the straight line portion 41 is disposed radially inside the virtual circle VC1 including the first arc portion 40 as a part. In other words, a distance d between the axial center O1 of the rotor core 11 and the center in the extending direction of the straight line portion 41 is smaller than the radius of curvature CR1 of the first arc portion 40. Specifically, from the viewpoint of fluid resistance (stirring loss) during rotation of the rotor 10, it is preferable that the distance d between the axial center O1 of the rotor core 11 and the center in the extending direction of the straight line portion 41 be 0.97 times or more of the radius of curvature CR1 of the first arc portion 40. As a result, the outer shape of the rotor core 11 is recessed inward in the radial direction of the rotor core 11 in the straight line portion 41. Note that, when the motor 5 is used for a compressor of an air conditioner, for example, resistance generated between a fluid containing refrigerant, mist-like lubricating oil, etc. and the rotor core 11 corresponds to the above fluid resistance.

The air gap G between the rotor 10 and the stator 20 in the straight line portion 41 gradually widens from both ends toward the center in the extending direction of the straight line portion 41, and becomes maximum at the center in the extending direction of the straight line portion 41.

The curved portion 42 in the present embodiment includes a second arc portion 43 having an arc shape with a radius of curvature CR2 (shown in FIG. 5) bulging outward in the radial direction of the rotor core 11. The radius of curvature CR2 of the second arc portion 43 is smaller than the radius of curvature CR1 of the first arc portion 40. The curved portion 42 is disposed radially inside the virtual circle VC1 including the first arc portion 40 as a part.

The air gap G between the rotor 10 and the stator 20 gradually widens from the first arc portion 40 side to the straight line portion 41 side in the second arc portion 43 of the curved portion 42.

As described above, the air gap G between the rotor 10 and the stator 20 is minimum and constant in the first arc portion 40, gradually widens in the second arc portion 43 of the curved portion 42 and the straight line portion 41, and becomes maximum at the center of the straight line portion 41. A change amount of the air gap G in the second arc portion 43 of the curved portion 42 is larger than a change amount of the air gap G in the straight line portion 41. In other words, the air gap G widens more gently in the straight line portion 41 than in the second arc portion 43 of the curved portion 42.

Figure 5:
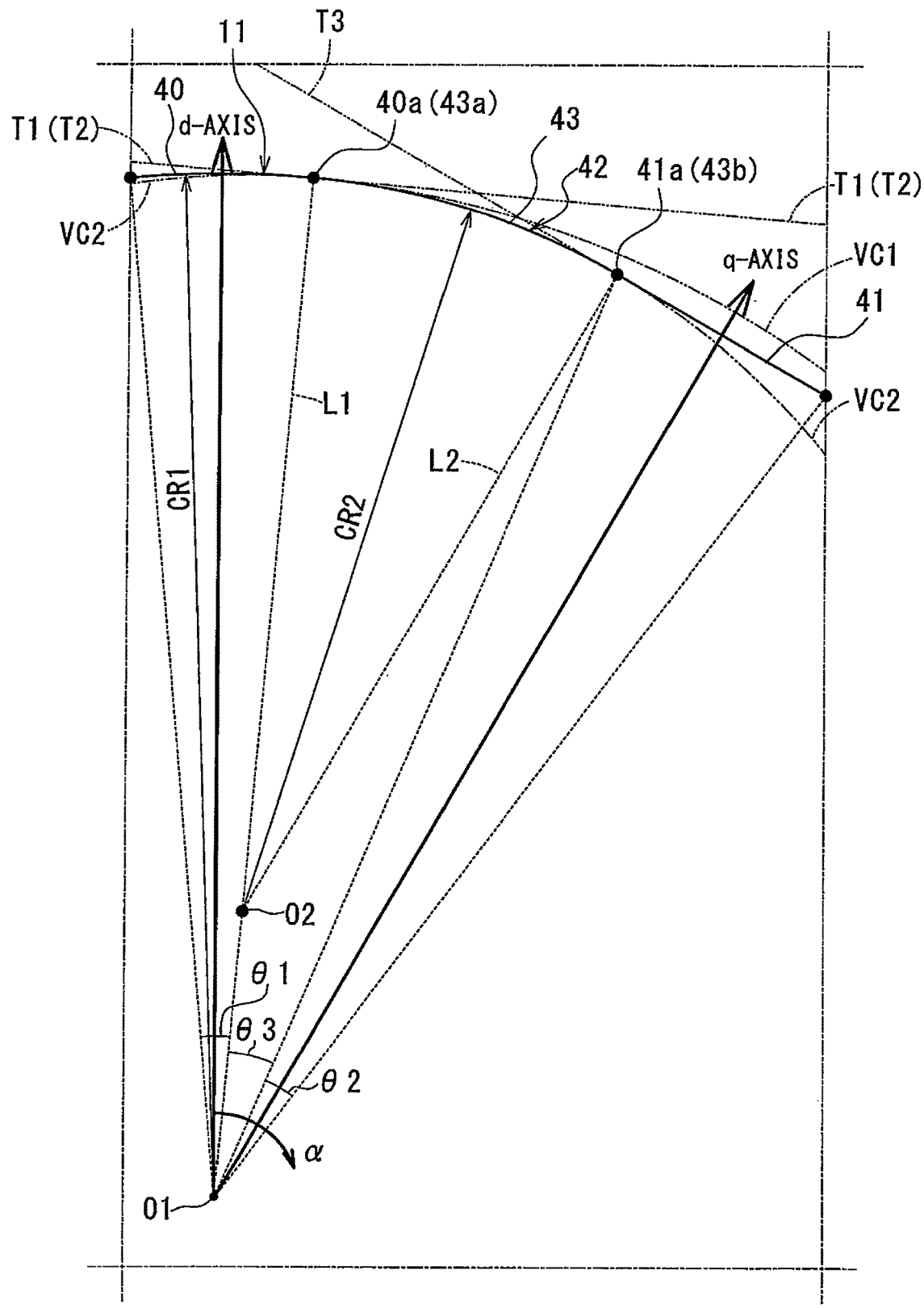
FIG. 5 is a schematic view showing an outer shape of a rotor core according to the first embodiment.

FIG. 5 is a schematic view showing the outer shape of the rotor core 11 according to the present embodiment. In FIG. 5, the shaft hole 12, the ventilation hole 13, the rivet hole 14, and the magnet insertion hole 15 of the rotor core 11 are not shown.

Referring to FIG. 5, the second arc portion 43 has an arc shape centered on a center point O2. The center point O2 is an intersection between a line L1 connecting an end point 40a of the first arc portion 40 and the axial center O1 of the rotor core 11 and a straight line L2 passing through an end point 41a of the straight line portion 41 and extending in a direction orthogonal to the extending direction of the straight line portion 41. By setting the center point O2 of the second arc portion 43 in this way, the second arc portion 43 smoothly connects the first arc portion 40 and the straight line portion 41. Further, by setting the center point O2 of the second arc portion 43 in this way, the radius of curvature CR2 of the second arc portion 43 is smaller than the radius of curvature CR1 of the first arc portion 40.

An angular range $\theta1$ of the first arc portion 40 is smaller than an angular range $\theta2$ of the straight line portion 41 when viewed from the axial center O1 of the rotor core 11. Further, an angular range $\theta3$ of the curved portion 42 is larger than the angular range $\theta2$ of the straight line portion 41 when viewed from the axial center O1 of the rotor core 11. In other words, a relationship of $\theta3>\theta2>\theta1$ is established between the angular range $\theta1$ of the first arc portion 40, the angular range $\theta2$ of the straight line portion 41, and the angular range $\theta3$ of the curved portion 42.

The first arc portion 40 and the second arc portion 43 in the present embodiment are directly connected. Specifically, the first arc portion 40 is connected with the second arc portion 43 at the end point 40a of the first arc portion 40, and the second arc portion 43 is connected with the first arc portion 40 at an end point 43a on the first arc portion 40 side of the second arc portion 43.

Further, the first arc portion 40 and the second arc portion 43 are smoothly connected. Specifically, a tangent line T1 of the first arc portion 40 at the end point 40a of the first arc portion 40 at which the first arc portion 40 is connected with the second arc portion 43 coincides with a tangent line T2 of the second arc portion 43 at the end point 43a of the second arc portion 43 at which the second arc portion 43 is connected with the first arc portion 40.

Here, the tangent line T1 of the first arc portion 40 at the end point 40a of the first arc portion 40 at which the first arc portion 40 is connected with the second arc portion 43 is a tangent line at the end point 40a on the second arc portion 43 side of the first arc portion 40 of the virtual circle VC1 including the first arc portion 40 as a part.

Similarly, the tangent line T2 of the second arc portion 43 at the end point 43a of the second arc portion 43 at which the second arc portion 43 is connected with the first arc portion 40 is a tangent line at the end point 43a on the first arc portion 40 side of the second arc portion 43 of a virtual circle VC2 including the second arc portion 43 as a part.

The straight line portion 41 and the second arc portion 43 in the present embodiment are directly connected. Specifically, the straight line portion 41 is connected with the second arc portion 43 at the end point 41a of the straight line portion 41, and the second arc portion 43 is connected with the straight line portion 41 at an end point 43b on the straight line portion 41 side of the second arc portion 43.

Further, the straight line portion 41 and the second arc portion 43 are smoothly connected. Specifically, an extending direction of a tangent line T3 of the second arc portion 43 at the end point 43b of the second arc portion 43 at which the second arc portion 43 is connected with the straight line portion 41 coincides with the extending direction of the straight line portion 41.

Here, the tangent line T3 of the second arc portion 43 at the end point 43b of the second arc portion 43 at which the second arc portion 43 is connected with the straight line portion 41 is a tangent line at the end point 43b on the straight line portion 41 side of the second arc portion 43 of the virtual circle VC2 including the second arc portion 43 as a part.

In the rotor core 11 of the present embodiment, if the distance d (shown in FIG. 4) between the axial center O1 of the rotor core 11 and the center in the extending direction of the straight line portion 41, the angular range $\theta2$ of the straight line portion 41 seen from the axial center O1 of the rotor core 11, and the radius of curvature CR1 of the first arc portion 40 are determined, there is a case where the angular range $\theta1$ of the first arc portion 40 seen from the axial center O1 of the rotor core 11 and the curved portion 42 (second arc portion 43) that smoothly connects the first arc portion 40 and the straight line portion 41 can be uniquely determined. Alternatively, if the distance d between the axial center O1 of the rotor core 11 and the center in the extending direction of the straight line portion 41, the radius of curvature CR1 of the first arc portion 40, and the angular range $\theta1$ of the first arc portion 40 seen from the axial center O1 of the rotor core 11 are determined, there is a case where the angular range $\theta2$ of the straight line portion 41 seen from the axial center O1 of the rotor core 11 and the curved portion 42 (second arc portion 43) that smoothly connects the first arc portion 40 and the straight line portion 41 can be uniquely determined.

Figure 6:
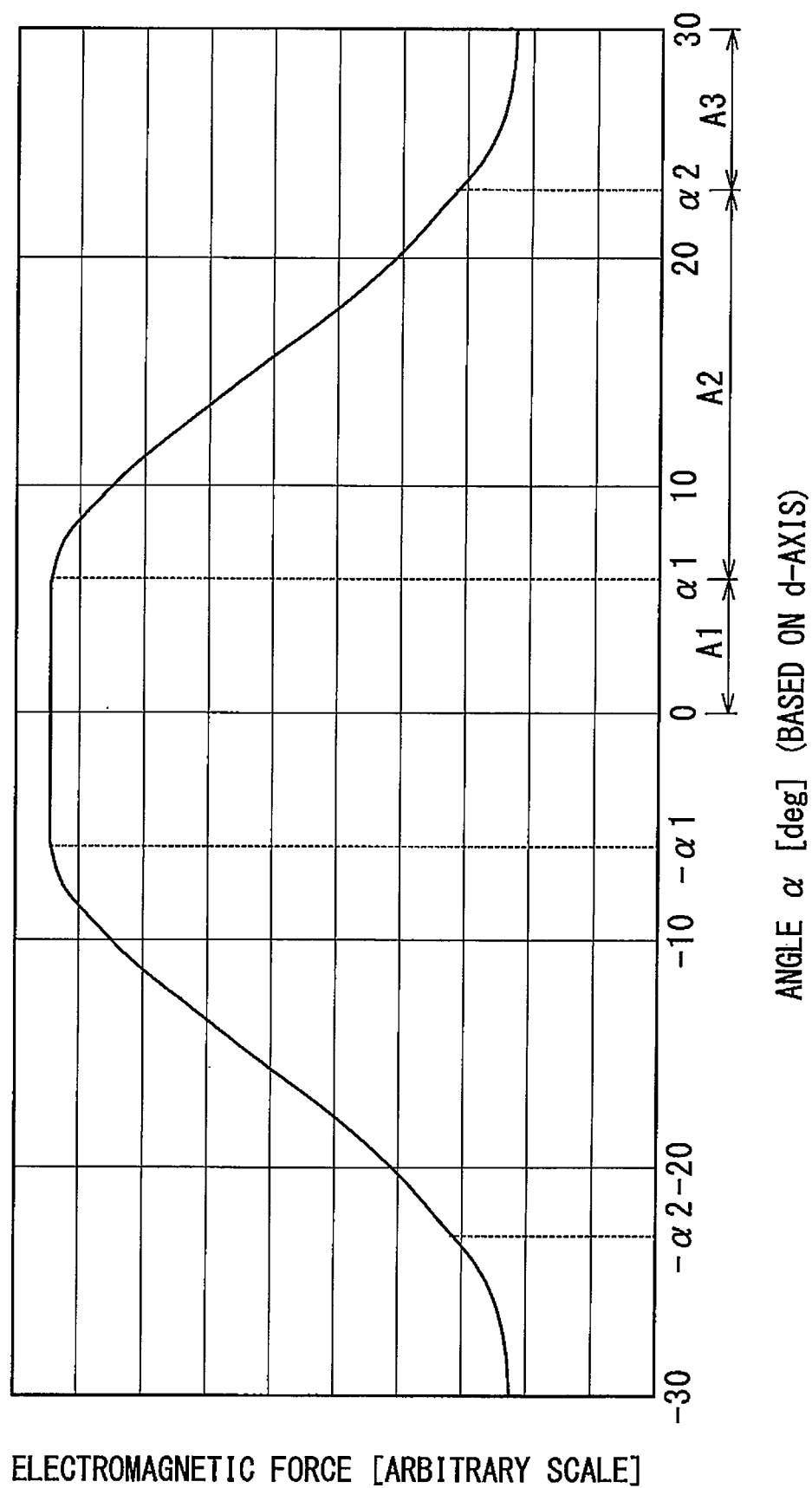
FIG. 6 is a graph showing a relationship between a circumferential position of the rotor in the first embodiment and electromagnetic force.

FIG. 6 is a graph showing a relationship between a circumferential position of the rotor 10 in the present embodiment and electromagnetic force generated between the rotor 10 and the stator 20. An angle (deg) on a horizontal axis of the graph in FIG. 6 is a mechanical angle $\alpha$ ($-30 \text{ deg} \leq \alpha \leq 30 \text{ deg}$) based on the d-axis of the rotor 10. In other words, $\alpha=0$ deg on the horizontal axis corresponds to the d-axis, and $\alpha=-30$ deg or 30 deg corresponds to the q-axis. Further, a vertical axis of the graph in FIG. 6 is electromagnetic force (arbitrary scale) generated between the rotor 10 and the stator 20. The electromagnetic force generated between the rotor 10 and the stator 20 is proportional to the square of a reciprocal of the air gap between the rotor 10 and the stator 20.

Since the graph shown in FIG. 6 is symmetric with respect to $\alpha=0$ deg, a range of $0 \text{ deg} \leq \alpha \leq 30 \text{ deg}$ will be mainly described below. With reference to FIG. 6, the electromagnetic force generated between the rotor 10 and the stator 20 decreases monotonically in the range of $0 \text{ deg} \leq \alpha \leq 30$ deg.

In the range of $0 \text{ deg} \leq \alpha \leq \alpha1$ (a region A1 in FIG. 6), the electromagnetic force generated between the rotor 10 and the stator 20 is constant. Here, referring to FIGS. 5 and 6 together, $\alpha=\alpha1$ corresponds to the end point 40a of the first arc portion 40 (or the end point 43a of the second arc portion 43 of the curved portion 42), and the region A1 corresponds to the first arc portion 40 of the outer shape of the rotor core 11.

The electromagnetic force generated between the rotor 10 and the stator 20 in the region A1 is constant because the first arc portion 40 has the arc shape centered on the axial center O1 of the rotor core 11 and therefore the air gap G (shown in FIG. 4) between the rotor 10 and the stator 20 is constant in the first arc portion 40.

Further, referring to FIG. 6, in a range of α1<α≤α2 (a region A2 in FIG. 6), the electromagnetic force generated between the rotor 10 and the stator 20 decreases as the mechanical angle α based on the d-axis of the rotor 10 increases. Here, referring to FIGS. 5 and 6 together, α=α2 corresponds to the end point 43b of the second arc portion 43 of the curved portion 42 (or the end point 41a of the straight line portion 41), and the region A2 corresponds to the second arc portion 43 of the curved portion 42 of the outer shape of the rotor core 11.

The electromagnetic force generated between the rotor 10 and the stator 20 in the region A2 decreases as the mechanical angle α based on the d-axis of the rotor 10 increases. This is because the air gap G (shown in FIG. 4) between the rotor 10 and the stator 20 increases from the first arc portion 40 side to the straight line portion 41 side in the second arc portion 43 of the curved portion 42.

Further, the electromagnetic force generated between the rotor 10 and the stator smoothly changes between the region A1 and the region A2. This is because the second arc portion 43 is smoothly connected with the first arc portion 40.

Furthermore, in a range of α2<α≤30 deg (a region A3 in FIG. 6), the electromagnetic force generated between the rotor 10 and the stator 20 decreases as the mechanical angle α based on the d-axis of the rotor 10 increases and is minimum at α=deg. Here, referring to FIGS. 5 and 6 together, the region A3 corresponds to the straight line portion 41 of the outer shape of the rotor core 11. Further, α=30 deg corresponds to the center in the extending direction of the straight line portion 41 of the outer shape of the rotor core 11.

The electromagnetic force generated between the rotor 10 and the stator 20 in the region A3 decreases as the mechanical angle α based on the d-axis of the rotor 10 increases. This is because the air gap G (shown in FIG. 4) between the rotor 10 and the stator 20 in the straight line portion 41 decreases form both the ends toward the center in the extending direction of the straight line portion 41.

Further, a change in the electromagnetic force generated between the rotor 10 and the stator 20 in the region A3 is gentler than a change in the electromagnetic force generated between the rotor 10 and the stator 20 in the region A2. This is because the air gap G (shown in FIG. 4) between the rotor 10 and the stator 20 widens more gently in the straight line portion 41 than in the second arc portion 43 of the curved portion 42.

Further, the electromagnetic force generated between the rotor 10 and the stator 20 smoothly changes between the region A2 and the region A3. This is because the second arc portion 43 is smoothly connected with the straight line portion 41.

According to the above configuration, since the radius of curvature CR2 of the second arc portion 43 is smaller than the radius of curvature CR1 of the first arc portion 40, the first arc portion 40 and the straight line portion 41 are smoothly connected by the curved portion 42 including the second arc portion 43. Therefore, a sudden change in the air gap G between the rotor 10 and the stator 20 due to rotation of the rotor 10 is suppressed, and a sudden change in the electromagnetic force generated between the rotor 10 and the stator 20 is suppressed. Accordingly, higher-order electromagnetic force is reduced. As a result, vibration caused by the higher-order electromagnetic force can be effectively suppressed.

According to the above embodiment, since the first arc portion 40 and the second arc portion 43 are smoothly connected, fluid resistance (stirring loss) during rotation of the rotor 10 can be reduced while effectively suppressing vibration.

According to the above embodiment, since the second arc portion 43 and the straight line portion 41 are smoothly connected, fluid resistance (stirring loss) during rotation of the rotor 10 can be reduced while effectively suppressing vibration.

Further, as is clear from FIG. 6, since the electromagnetic force generated between the rotor 10 and the stator 20 is maximum and constant in the region near the d-axis of the rotor core 11 (the region A1 in FIG. 6), characteristics (generated torque) of the motor 5 can be fully exhibited. On the other hand, since the electromagnetic force generated between the rotor 10 and the stator 20 can be reduced in the region near the q-axis of the rotor core 11 (the region A3 in FIG. 6), vibration caused by the electromagnetic force generated between the motor 5 and the rotor 10 can be suppressed. In other words, according to the rotor 10 of the motor 5 in the present embodiment, it is possible to suppress the vibration caused by the electromagnetic force generated between the motor 5 and the stator 20 and suppress noise while suppressing a decrease in the torque generated by the motor 5.

Second Embodiment

A rotor core 111 according to a second embodiment is the same as that of the first embodiment except for a configuration of a curved portion 142. In the second embodiment, the same configuration as that of the first embodiment is designated by the same reference number, and the description thereof will be omitted.

Figure 7:
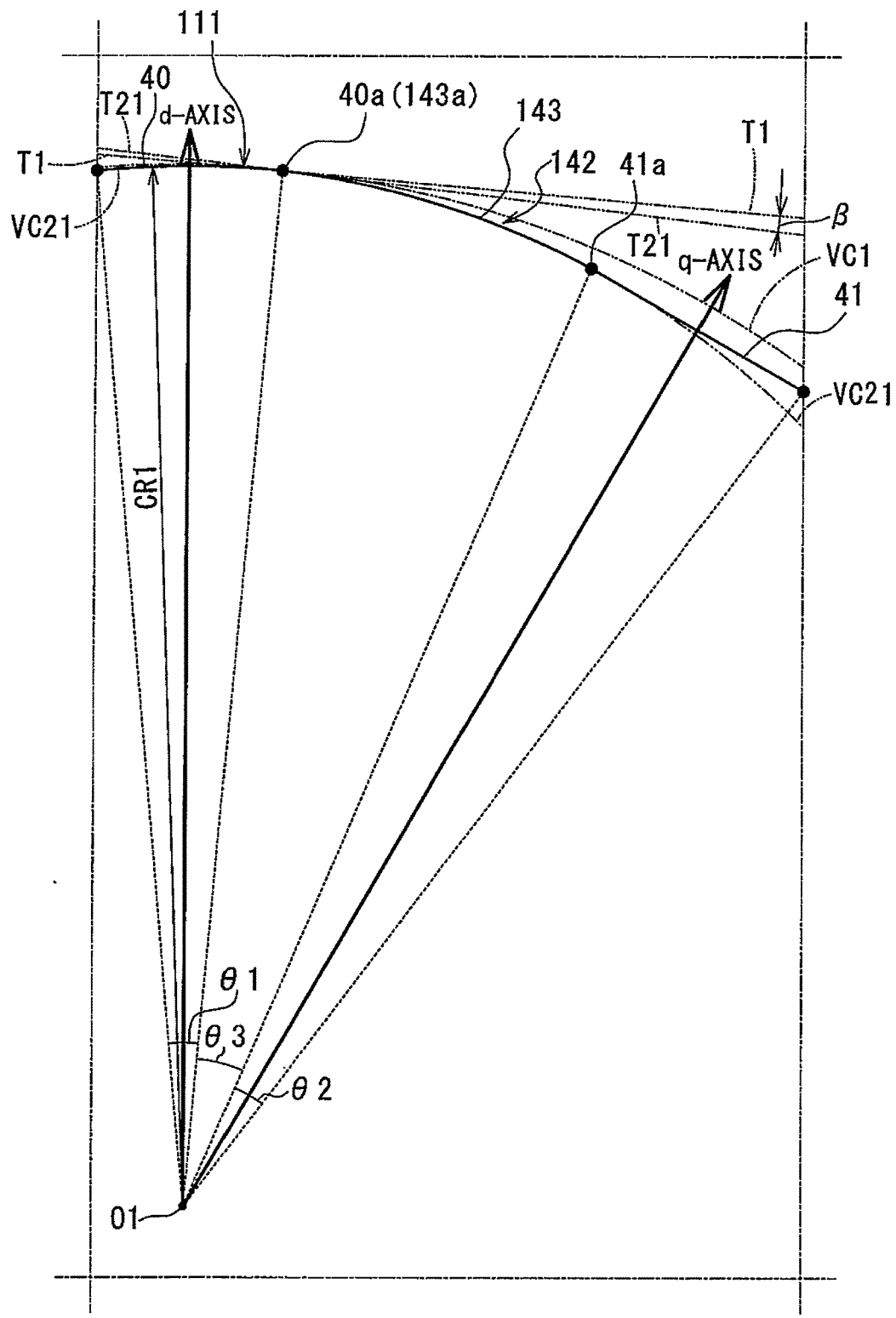
FIG. 7 is a schematic view showing an outer shape of a rotor core according to a second embodiment.

FIG. 7 is a diagram schematically showing an outer shape of the rotor core 111 according to the second embodiment.

Referring to FIG. 7, the curved portion 142 of the present embodiment is disposed radially inside the virtual circle VC1 including the first arc portion 40 as a part. Further, the curved portion 142 in the present embodiment includes a second arc portion 143 which has an arc shape bulging outward in a radial direction. A radius of curvature of the second arc portion 143 is smaller than the radius of curvature CR1 of the first arc portion 40.

The first arc portion 40 and the second arc portion 143 in the present embodiment are directly connected. Specifically, the first arc portion 40 is connected with the second arc portion 143 at the end point 40a of the first arc portion 40, and the second arc portion 143 is connected with the first arc portion 40 at an end point 143a on the first arc portion 40 side of the second arc portion 143.

Further, the first arc portion 40 and the second arc portion 143 are substantially smoothly connected. Specifically, inclination of the tangent line T1 of the first arc portion 40 at the end point 40a of the first arc portion 40 at which the first arc portion 40 is connected with the second arc portion 143 substantially coincides with inclination of a tangent line T21 of the second arc portion 143 at the end point 143a of the second arc portion 143 at which the second arc portion 143 is connected with the first arc portion 40.

Here, the tangent line T21 of the second arc portion 143 at the end point 143a of the second arc portion 143 at which the second arc portion 143 is connected with the first arc portion 40 is a tangent line at the end point 143a on the first arc portion 40 side of the second arc portion 143 of a virtual circle VC21 including the second arc portion 143 as a part.

When the inclination of the tangent line T1 of the first arc portion 40 substantially coincides with the inclination of the tangent line T21 of the second arc portion 143, an angle β formed by the tangent line T1 and the tangent line T21 is 0 deg<β≤2 deg.

The present embodiment produces functional effects similar to those of the first embodiment.

Further, according to the above embodiment, since the first arc portion 40 and the second arc portion 143 are connected substantially smoothly, fluid resistance (stirring loss) during rotation of the rotor can be reduced while suppressing vibration.

Third Embodiment

A rotor core 211 according to a third embodiment is the same as that of the first embodiment except for a configuration of a curved portion 242. In the third embodiment, the same configuration as that of the first embodiment is designated by the same reference number, and the description thereof will be omitted.

Figure 8:
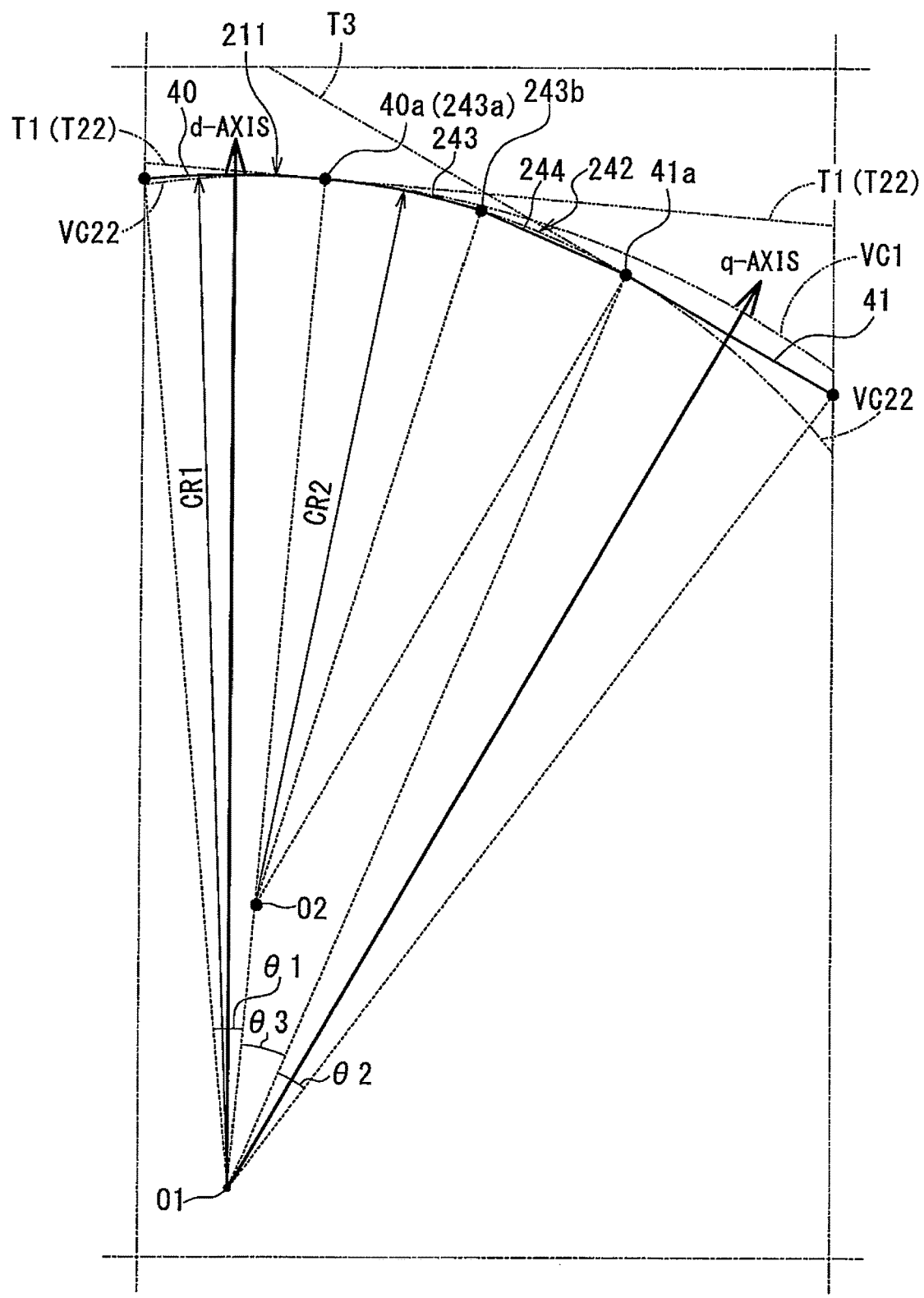
FIG. 8 is a schematic view showing an outer shape of a rotor core according to a third embodiment.

FIG. 8 is a diagram schematically showing an outer shape of the rotor core 211 according to the third embodiment.

Referring to FIG. 8, the curved portion 242 in the present embodiment includes a second arc portion 243 disposed on the first arc portion 40 side and a straight line portion 244 disposed on the straight line portion 41 side. The second arc portion 243 in the present embodiment has an arc shape with a radius of curvature CR2 centered on the center point O2.

The first arc portion 40 and the second arc portion 243 in the present embodiment are directly connected. Specifically, the first arc portion 40 is connected with the second arc portion 243 at the end point 40a of the first arc portion 40, and the second arc portion 243 is connected with the first arc portion 40 at an end point 243a on the first arc portion 40 side of the second arc portion 243.

Further, the first arc portion 40 and the second arc portion 243 are smoothly connected. Specifically, the tangent line T1 of the first arc portion 40 at the end point 40a of the first arc portion 40 at which the first arc portion 40 is connected with the second arc portion 243 coincides with a tangent line T22 of the second arc portion 243 at the end point 243a of the second arc portion 243 at which the second arc portion 243 is connected with the first arc portion 40.

Here, the tangent line T22 of the second arc portion 243 at the end point 243a of the second arc portion 243 at which the second arc portion 243 is connected with the first arc portion 40 is a tangent line at the end point 243a on the first arc portion 40 side of the second arc portion 243 of a virtual circle VC22 including the second arc portion 243 as a part.

The straight line portion 41 and the second arc portion 243 in the present embodiment are connected via the straight line portion 244 of the curved portion 242. Specifically, the straight line portion 41 is connected with the straight line portion 244 of the curved portion 242 at the end point 41a of the straight line portion 41, and the second arc portion 243 is connected with the straight line portion 244 of the curved portion 242 at an end point 243b on the straight line portion 41 side of the second arc portion 243.

The third embodiment produces functional effects similar to those of the first embodiment.

Fourth Embodiment

A rotor core 311 according to a fourth embodiment is the same as that of the first embodiment except for a configuration of a curved portion 342. In the fourth embodiment, the same configuration as that of the first embodiment is designated by the same reference number, and the description thereof will be omitted.

Figure 9:
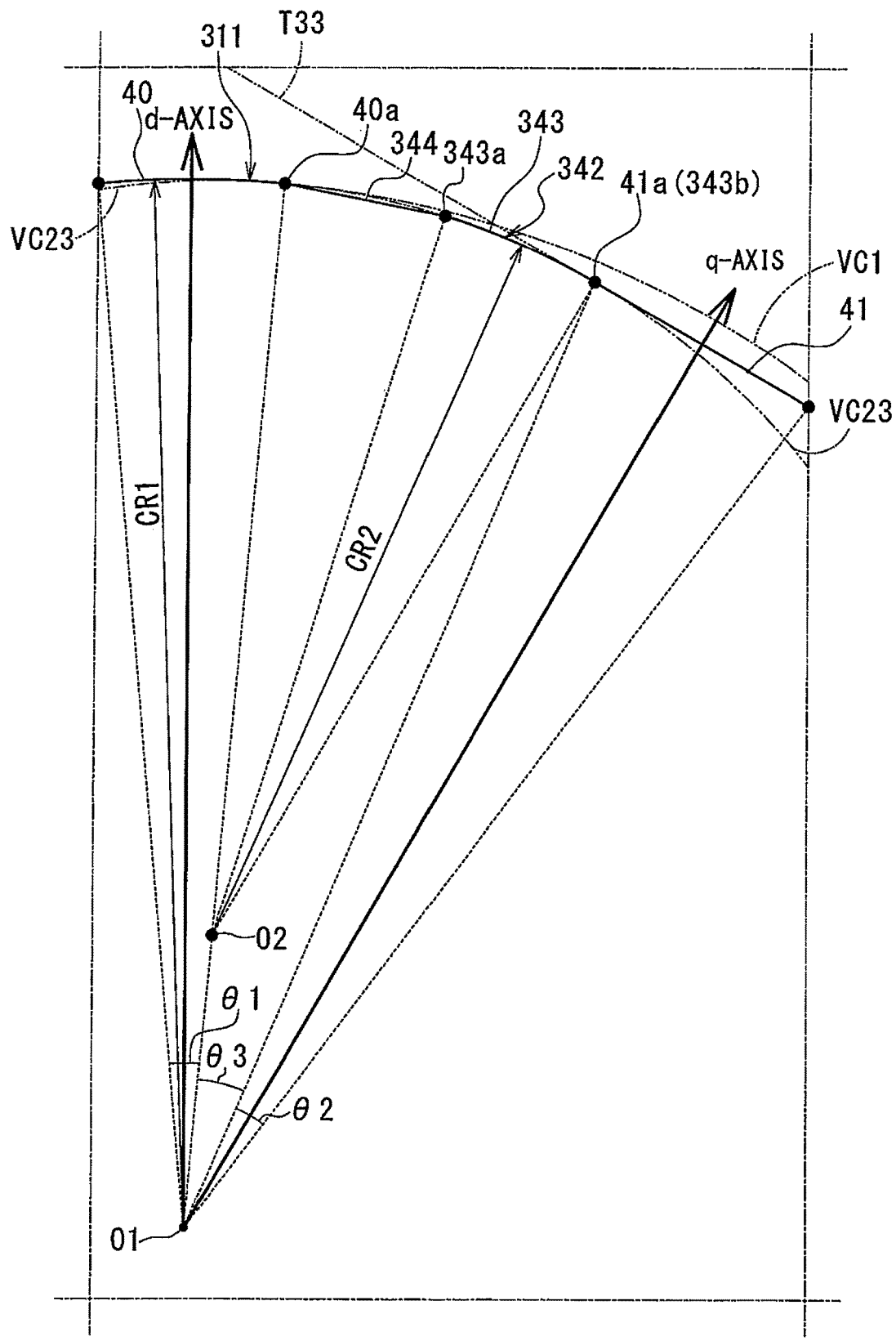
FIG. 9 is a schematic view showing an outer shape of a rotor core according to a fourth embodiment.

FIG. 9 is a diagram schematically showing an outer shape of the rotor core 311 according to the third embodiment.

Referring to FIG. 9, the curved portion 342 in the present embodiment includes a second arc portion 343 disposed on the straight line portion 41 side and a straight line portion 344 disposed on the first arc portion 40 side. The second arc portion 343 in the present embodiment has an arc shape with a radius of curvature CR2 centered on the center point O2.

The straight line portion 41 and the second arc portion 343 in the present embodiment are directly connected. Specifically, the straight line portion 41 is connected with the second arc portion 343 at the end point 41a of the straight line portion 41, and the second arc portion 343 is connected with the straight line portion 41 at an end point 343b on the straight line portion 41 side of the second arc portion 343.

Further, the straight line portion 41 and the second arc portion 343 are smoothly connected. Specifically, an extending direction of a tangent line T33 of the second arc portion 343 at the end point 343b of the second arc portion 343 at which the second arc portion 343 is connected with the straight line portion 41 coincides with the extending direction of the straight line portion 41.

Here, the tangent line T33 of the second arc portion 343 at the end point 343b of the second arc portion 343 at which second arc portion 343 is connected with the straight line portion 41 is a tangent line at the end point 343b on the straight line portion 41 side of the second arc portion 343 of a virtual circle VC23 including the second arc portion 343 as a part.

The first arc portion 40 and the second arc portion 343 in the present embodiment are connected via the straight line portion 344 of the curved portion 342. Specifically, the first arc portion 40 is connected with the straight line portion 344 of the curved portion 342 at the end point 40a of the first arc portion 40, and the second arc portion 343 is connected with the straight line portion 344 of the curved portion 342 at an end point 343a on the first arc portion side of the second arc portion 343.

The fourth embodiment produces functional effects similar to those of the first embodiment.

Fifth Embodiment

A rotor core 411 according to a fifth embodiment is the same as that of the first embodiment except for a configuration of a curved portion 442. In the fifth embodiment, the same configuration as that of the first embodiment is designated by the same reference number, and the description thereof will be omitted.

Figure 10:
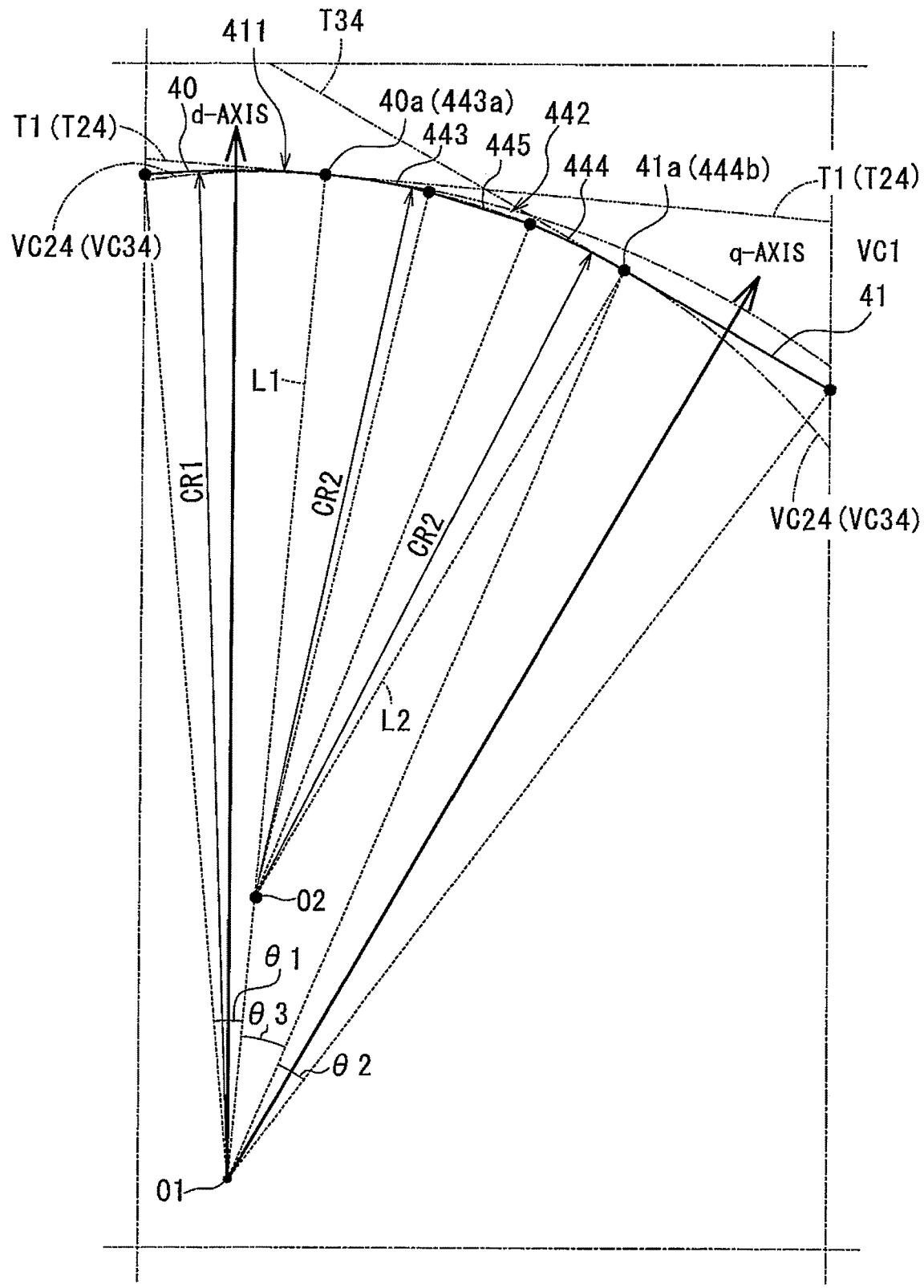
FIG. 10 is a schematic view showing an outer shape of a rotor core according to a fifth embodiment.

FIG. 10 is a diagram schematically showing an outer shape of the rotor core 411 according to the fifth embodiment.

Referring to FIG. 10, the curved portion 442 in the present embodiment includes a second arc portion 443 disposed on the first arc portion 40 side, a third arc portion 444 disposed on the straight line portion 41 side, and a straight line portion 445 that connects the second arc portion 443 and the third arc portion 444. The second arc portion 443 in the present embodiment has an arc shape with a radius of curvature CR2 centered on the center point O2. Similarly, the third arc portion 444 in the present embodiment has an arc shape with a radius of curvature CR2 centered on the center point O2.

The first arc portion 40 and the second arc portion 443 in the present embodiment are directly connected. Specifically, the first arc portion 40 is connected with the second arc portion 443 at the end point 40a of the first arc portion 40, and the second arc portion 443 is connected with the first arc portion 40 at an end point 443a on the first arc portion 40 side of the second arc portion 443.

Further, the first arc portion 40 and the second arc portion 443 are smoothly connected. Specifically, the tangent line T1 of the first arc portion 40 at the end point 40a connected with the second arc portion 443 of the first arc portion 40 coincides with a tangent line T24 of the second arc portion 443 at the end point 443a connected with the first arc portion 40 of the second arc portion 443.

Here, the tangent line T24 of the second arc portion 443 at the end point 443a connected with the first arc portion 40 of the second arc portion 443 is a tangent line at the end point 443a on the first arc portion 40 side of the second arc portion 443 of a virtual circle VC24 including the second arc portion 443 as a part.

The straight line portion 41 and the third arc portion 444 in the present embodiment are directly connected. Specifically, the straight line portion 41 is connected with the third arc portion 444 at the end point 41a of the straight line portion 41, and the third arc portion 444 is connected with the straight line portion 41 at an end point 444b on the straight line portion 41 side of the third arc portion 444.

Further, the straight line portion 41 and the third arc portion 444 are smoothly connected. Specifically, an extending direction of a tangent line T34 of the third arc portion 444 at the end point 444b connected with the straight line portion 41 of the third arc portion 444 coincides with the extending direction of the straight line portion 41.

Here, the tangent line T34 of the third arc portion 444 at the end point 444b connected with the straight line portion 41 of the third arc portion 444 is a tangent line at the end point 444b on the straight line portion 41 side of the third arc portion 444 of a virtual circle VC34 including the third arc portion 444 as a part.

The fifth embodiment produces functional effects similar to those of the first embodiment.

While various embodiments have been described herein above, it is to be appreciated that various changes in form and detail may be made without departing from the spirit and scope presently or hereafter claimed. For example, the number of poles of the rotor in the present disclosure is not limited to six as in the first to fifth embodiments, and another number of poles (for example, four poles) may be used. When the other number of poles is used, a shape of the rotor may be determined based on a ratio of the number of poles (6/X when the other number of poles is X).

What is claimed is:

1. A rotor comprising:
    a rotor core having an outer shape including:
        a first arc portion provided so as to intersect a d-axis,
        a straight line portion provided so as to intersect a q-axis, and
        a curved portion that connects the first arc portion and the straight line portion,
        the first arc portion having an arc shape centered on an axial center of the rotor core,
        the curved portion including an arc-shaped second arc portion that bulges outward in a radial direction of the rotor core,
        the straight line portion linearly extending so that the straight line portion is directly connected to the second arc portion, and
        a radius of curvature of the second arc portion being smaller than a radius of curvature of the first arc portion.
2. The rotor according to claim 1, wherein
    an angular range in a circumferential direction of the straight line portion is larger than an angular range in a circumferential direction of the first arc portion, when viewed along the axial center of the rotor core.
3. The rotor according to claim 1, wherein
    an angular range in a circumferential direction of the curved portion is larger than an angular range in the circumferential direction of the straight line portion, when viewed along the axial center of the rotor core.
4. The rotor according to claim 1, wherein
    the first arc portion and the second arc portion are directly connected, and
    inclination of a tangent line of the second arc portion at an end point of the second arc portion at which the second arc portion is connected to the first arc portion substantially coincides with inclination of a tangent line of the first arc portion at an end point of the first arc portion at which the first arc portion is connected to the second arc portion.
5. The rotor according to claim 1, wherein
    a tangent line of the second arc portion at an end point of the second arc portion at which the second arc portion is connected to the first arc portion coincides with a tangent line of the first arc portion at an end point of the first arc portion at which the first arc portion is connected to the second arc portion.
6. The rotor according to claim 1, wherein
    the second arc portion and the straight line portion are directly connected, and
    a tangent line of the second arc portion at an end point of the second arc portion at which the second arc portion is connected to the straight line portion extends in an extending direction of the straight line portion.
7. A motor including the rotor according to claim 1, the motor further comprising:
    a stator disposed so as to surround an outer peripheral surface of the rotor.
8. A compressor including the motor according to claim 7, the compressor further comprising:
    a hermetic container; and
    a compression mechanism unit disposed in the hermetic container,
    the motor being disposed in the hermetic container and being configured to drive the compression mechanism unit via a rotating shaft.

* * * * *